(12) United States Patent
Forsyth

(10) Patent No.: US 6,190,437 B1
(45) Date of Patent: Feb. 20, 2001

(54) IODINATED AIR FILTER

(75) Inventor: Gary Durham Forsyth, Orillia (CA)

(73) Assignee: Aria Pureair Ltd., Markham (CA)

( * ) Notice: Under 35 U.S.C. 154(b), the term of this patent shall be extended for 0 days.

(21) Appl. No.: 09/344,115

(22) Filed: Jun. 24, 1999

(51) Int. Cl.$^7$ .............................. B01D 46/10; B01D 53/04
(52) U.S. Cl. .................................. 95/90; 95/116; 95/285; 96/135; 96/142; 96/154; 96/226; 55/485; 55/486; 55/524; 210/501
(58) Field of Search .............................. 95/90, 136, 273, 95/274, 285; 96/108, 134–142, 154, 223, 226, FOR 170; 210/501; 55/485, 486, 495, 522, 524, 528

(56) References Cited

U.S. PATENT DOCUMENTS

| | | | | |
|---|---|---|---|---|
| 3,230,033 | * | 1/1966 | Hamilton et al. | 96/226 X |
| 3,429,103 | * | 2/1969 | Taylor | 210/501 X |
| 3,817,860 | * | 6/1974 | Lambert et al. | 210/501 X |
| 3,923,665 | * | 12/1975 | Lambert et al. | 210/501 X |
| 4,238,477 | * | 12/1980 | Lambert et al. | 210/501 X |
| 4,312,647 | * | 1/1982 | Tsuchiya et al. | 96/154 X |
| 4,483,771 | * | 11/1984 | Koch | 210/501 X |
| 4,604,110 | * | 8/1986 | Frazier | 95/136 X |
| 5,015,451 | * | 5/1991 | Hölter et al. | 95/90 X |
| 5,176,836 | * | 1/1993 | Sauer et al. | 210/501 X |
| 5,240,478 | * | 8/1993 | Messina | 95/273 |
| 5,269,919 | * | 12/1993 | von Medlin | 210/501 X |
| 5,288,298 | * | 2/1994 | Aston | 96/226 X |
| 5,390,668 | * | 2/1995 | Lehman | 96/108 X |
| 5,529,609 | * | 6/1996 | Gooch et al. | 95/90 |
| 5,554,288 | * | 9/1996 | Rydell et al. | 210/501 X |
| 5,558,158 | * | 9/1996 | Elmore | 95/273 X |
| 5,591,350 | * | 1/1997 | Piechocki et al. | 210/501 X |
| 5,772,738 | * | 6/1998 | Muraoka | 96/154 X |
| 5,874,052 | * | 2/1999 | Holland | 96/226 X |
| 5,876,489 | * | 3/1999 | Kunisaki et al. | 96/226 |

* cited by examiner

Primary Examiner—Robert H. Spitzer

(57) ABSTRACT

An air filter for effectively filtering bacteria, fungi and viruses from the air. The air filter comprising of a carrier substrate impregnated with iodine resins effectively immobilizes and attenuates bacteria, fungi and viruses contained in passing air. The air filter may be employed in combination with a multi-layered air filter to provide a filter which effectively purifies passing air of a variety of contaminants. The air filter provides a safe and effective method for the removal of bacteria, fungi and viruses from the air.

9 Claims, 3 Drawing Sheets

US 6,190,437 B1

IODINATED AIR FILTER

FIELD OF THE INVENTION

The present invention provides a novel air filter for effectively providing purified air. The air filter of the present invention is particularly effective in the removal of bacteria, fungi and viruses from the air.

BACKGROUND

The progress of the industrialized world has not come without consequence. In recent decades, there has been a global increase in the incidence of disease, as well as a rapid deterioration in the health of our environment. As we approach the 21$^{st}$ century, many of us look for ways to control the quality of the environment in which we live, including the air we breath, the water we drink and the nutritional value of our food.

The quality of the air we breath is particularly concerning, as we require a continual source of oxygen to ensure our survival. For the most part, we are unaware of the potential dangers of the air we breath because some of the most harmful substances we encounter are in the form of colourless, odourless gases and microscopic organisms and particulate.

correlation with the demand for improved air quality in homes, offices and institutions worldwide, many air purification devices have appeared in the global marketplace. However, the limitation of such devices has been in both the removal and neutralization of viruses, fungi and bacteria from the air. Thus, there appears to be an unmet demand for an air filter with improved purification capabilities, particularly with respect to the removal of viruses, fungi and bacteria from the air. In addition, there is a need for such an improved air filter which effectively attenuates the viruses, fungi and bacteria with which it comes into contact, so as to provide an air filter which is easily and safely discarded after use. Further still, there is increasing demand for such a filter which is economically feasible for general use in homes and offices.

SUMMARY OF THE INVENTION

The present invention is directed to a novel air filter for effectively providing purified air. The present invention is particularly effective in removing bacteria, fungi and viruses from the air.

In accordance with one aspect of the present invention there is provided an air filter for use in purifying air of bacteria, fungi and viruses; said air filter comprised of a carrier substrate impregnated with iodine resins. No proprietary right is claimed in a single substrate impregnated with an iodinated resin.

In accordance with another aspect of the present invention there is provided a multi-layered air filter for use in purifying air of a variety of contaminants, said air filter comprised of a particulate immobilizing medium; an iodinated resin substrate; and a zeolite composite medium.

In accordance with another aspect of the present invention there is provided an air purification unit for insertion in an air flow system, comprised of a housing having an air inlet and an air outlet; and a multi-layered air filter proximate said air outlet; wherein said multi-layered air filter includes a particulate immobilizing medium, an iodinated resin substrate and a zeolite composite medium.

In accordance with a further aspect of the present invention there is provided an air purification system comprised of a housing having an air inlet and an air outlet; an air intake means in connection with said housing for drawing air into said air inlet and subsequently forcing air to exit said housing at said air outlet; and a multi-layered air filter proximate said air outlet; wherein said multi-layered air filter includes a particulate immobilizing medium, an iodinated resin substrate and a zeolite composite medium.

In accordance with yet another aspect of the present invention there is provided a method of removing viruses, fungi and bacteria from air; said method comprising of passing contaminated air through an iodinated resin substrate, wherein iodine resins are impregnated into a permeable carrier substrate.

In accordance with yet a further aspect of the present invention there is provided a method of purifying air, said method comprising of passing contaminated air through a filter unit; wherein said filter unit includes a particulate immobilizing medium; an iodinated resin substrate; and a zeolite composite medium.

BRIEF DESCRIPTION OF THE DRAWINGS

The above and further advantages of this invention will be seen in reading the description of the preferred embodiments together with reference to the drawings, wherein.

DETAILED DESCRIPTION OF THE INVENTION

As the world's population increases, so too does industrialism, resulting in an exponential growth in overall production. Unfortunately, this growth is inadvertently accompanied by pollution, which contaminants our planet, and particularly, the air we breath. With each breath we take, we not only inhale gases which are critical to our existence, but also particles of dust and debris, vapourized chemicals and microscopic organisms including bacteria, viruses and fungi. Accordingly, the challenge to provide a multi-faceted air filter is complex as each group of contaminants displays unique physical and chemical properties.

Figure 1:
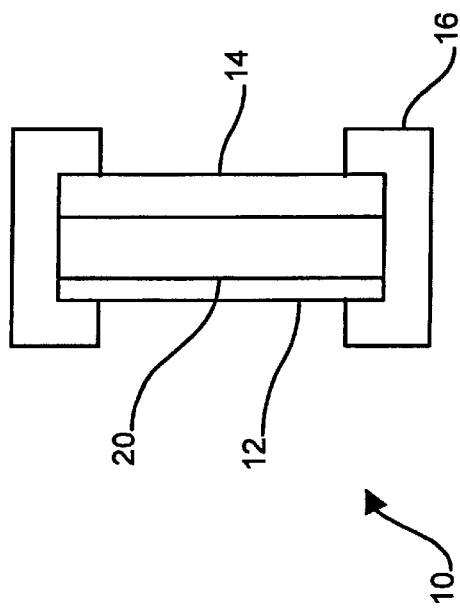
FIG. 1 is a sectional view of an air filter arrangement of the present invention.

The present invention is directed to a novel air filtering medium having superior effectiveness in the attenuation of airborne bacteria, fungi and viruses. FIG. 1 illustrates a filter unit 10 comprising of filter plates 12, 14 and 20. The filter plates 12, 20 and 14 are respectively positioned in a parallel layered arrangement by brackets 16. In such an arrangement, filter unit 10 may be easily inserted into a variety of filtering systems, as discussed below. Further, filter unit 10 of the present invention is not limited in size or shape and may be customized for incorporation at a variety of locations within many ventilation and filtration systems.

Filter unit 10 is shown to include three differentiating filter plates 12, 14 and 20 each of which function to remove a particular contaminant group from the air. Filter plate 12 is provided to trap particles of dust and debris as air flows through filter unit 10. Filter plate 12 generally comprises of a polypropylene composite matrix, which is known in the art of filtration mediums to effectively trap particles in the range of sizes of most airborne particulate. Filter plate 12 may be formed from other industry standard materials known to effectively filter particulate of this kind. Filter plate 14 comprises of a zeolite impregnated medium to effectively remove odour and unwanted gases from passing air. It would also be within the scope of this invention to replace this medium with an equally effective industry standard alternative. Filter plate 20 is shown to displace filter plates 12 and 14 and is comprised of an iodinated resin substrate which effectively attenuates airborne bacteria, fungi and viruses. The construction of filter plate 20 is shown in more detail in FIG. 2.

Figure 2:
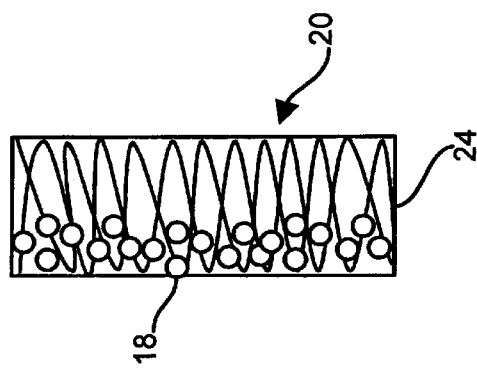
FIG. 2 is a sectional view of an air filter of the present invention.

In accordance with the present invention it has been discovered that iodine resins 18 effectively immobilize and attenuate airborne bacteria, fungi and viruses (Tables 1–2). Accordingly, by impregnating a permeable carrier substrate 24 with iodine resins 18, it is possible to provide a filter plate 20, as shown in FIG. 2, which is capable of effectively filtering microbial components from passing air. The carrier substrate 24 may be a permeable nylon such as the female member of Velcro™, or another suitable carrier which effectively adheres resins of iodine. The ability of the iodinated resin substrate to immobilize and attenuate bacteria, fungi and viruses further provides a safe and convenient filter medium that can be easily removed from a filtration or ventilation system and discarded without the fear of residual contamination. Further still, the present invention provides an economically efficient filter medium which is disposable, and provides for quick and easy replacement.

Filter plate 20 may be impregnated with iodine resins 18 on one or both sides of the substrate carrier 24. Optimally, a 100% saturation of iodine resins on substrate carrier 24 is achieved for a one-sided filter plate 20. Similarly, in the case of a two-sided filter plate 20, a 200% saturation of the substrate carrier 24 is preferred. However, effective filtration of bacteria, fungi and viruses may be achieved at saturation points of less than these preferred levels.

Figure 5:
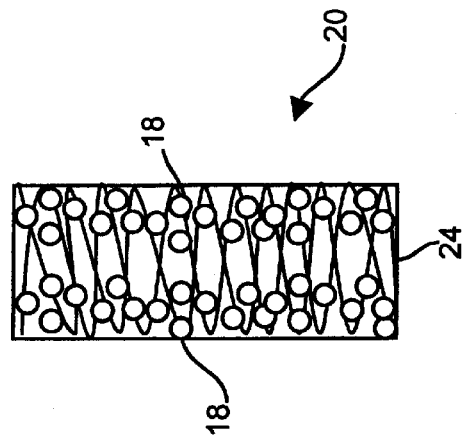
FIG. 5 is a sectional view of an air filtering apparatus in accordance with another embodiment of the present invention.

FIG. 5 illustrates the embodiment of the present invention where filter plate 20 is impregnated with iodine resins on two sides. In accordance with this embodiment, the capacity of the filter plate 20 may be increased. Iodine resins 18 of both embodiments of filter plate 20, as depicted in FIGS. 2 and 5, may be impregnated onto carrier substrates 24 of the appropriate size and shape by processes of sublimation, diffusion or direct contact, which are well-known in the art of immobilizing resins. In this manner, iodine resins 18 are securely adhered to a carrier substrate 24 and can be utilized in combination with other filter mediums to provide high-efficiency filter units, such as filter unit 10 as illustrated in FIG. 1. Alternatively, filter plates 20 may be easily inserted into a location about an existing ventilation or filtration system. The present invention is not limited to a particular combination of filter plate 20 with other effective filtering mediums or apparatuses.

When filter plate 20 is used in combination with filter plates 12 and 14 to provide filter unit 10, passing air is first depleted of its airborne particulate by filter plate 12. Subsequently, airborne microbes, including bacteria, fungi and viruses adhere to iodine resins 18 of filter plate 20 and become attenuated in the presence of this metallic halogen. Finally, the air passes through filter plate 14 which absorbs odour and other foreign gaseous substances, such as $CO_2$. As a result, air is effectively purified after passing through filter unit 10.

Figure 3:
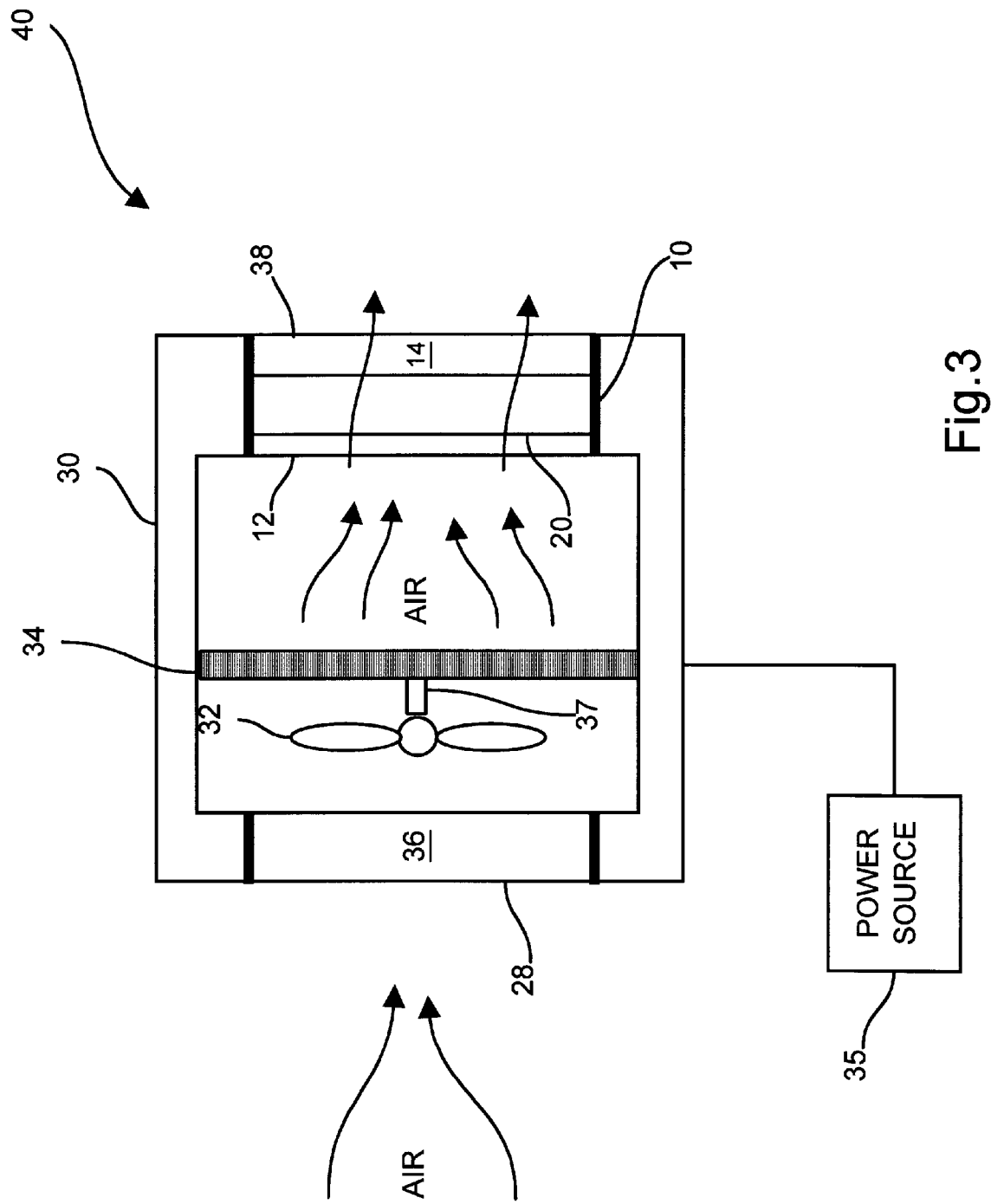
FIG. 3 is a sectional view of an air filter in accordance with an embodiment of the present invention.

As mentioned above, filter unit 10 or filter plate 20 alone, may be incorporated into a variety of air purification systems and apparatuses without being devoid of the present invention. One such system, which is in accordance with an embodiment of the present invention, is depicted in FIG. 3. Air purification system 40 comprises of a housing 30 having an air inlet 28 and an air outlet 38. Housing 30 includes an air intake means 32 secured to mounting 34 between the air inlet 28 and the air outlet 38, which serves to draw air in through air inlet 28 and subsequently force the air through air outlet 38, past filter unit 10. The air intake means 32 may be, for example, a standard fan driven by a mechanical motor 37, in connection with a power source 35. Alternatively, air purification system 40 may be devoid of an air intake means 32 and employed as a filtering system which is inserted into an existing air flow system. For example, in the absence of an air intake means 32, the air purification system 40 may be inserted at a location within an existing air flow system within an office building or a home so as to provide air purification.

In accordance with the air purification system 40, depicted in FIG. 3, an air filter 36 is retrofitted along air inlet 28 and acts as a mechanical barrier to particulate in the incoming air. In addition, a filter unit 10, as described above, is located in the region of the air outlet 38 to provide the air purification system 40 with a means for high-efficiency air filtration. Air intake means 32 is situated within housing 30 to draw air through the air inlet 28 and into the housing 30, and subsequently force the air out the air outlet 38. In doing so, the air is filtered by air filter 36, and filter plates 12, 20 and 14. In accordance with this embodiment of the present invention, there is provided a high-efficiency air filtration system which is capable of purifying air of particulate, unwanted gases, odour and bacteria, fungi and viruses.

Figure 4:
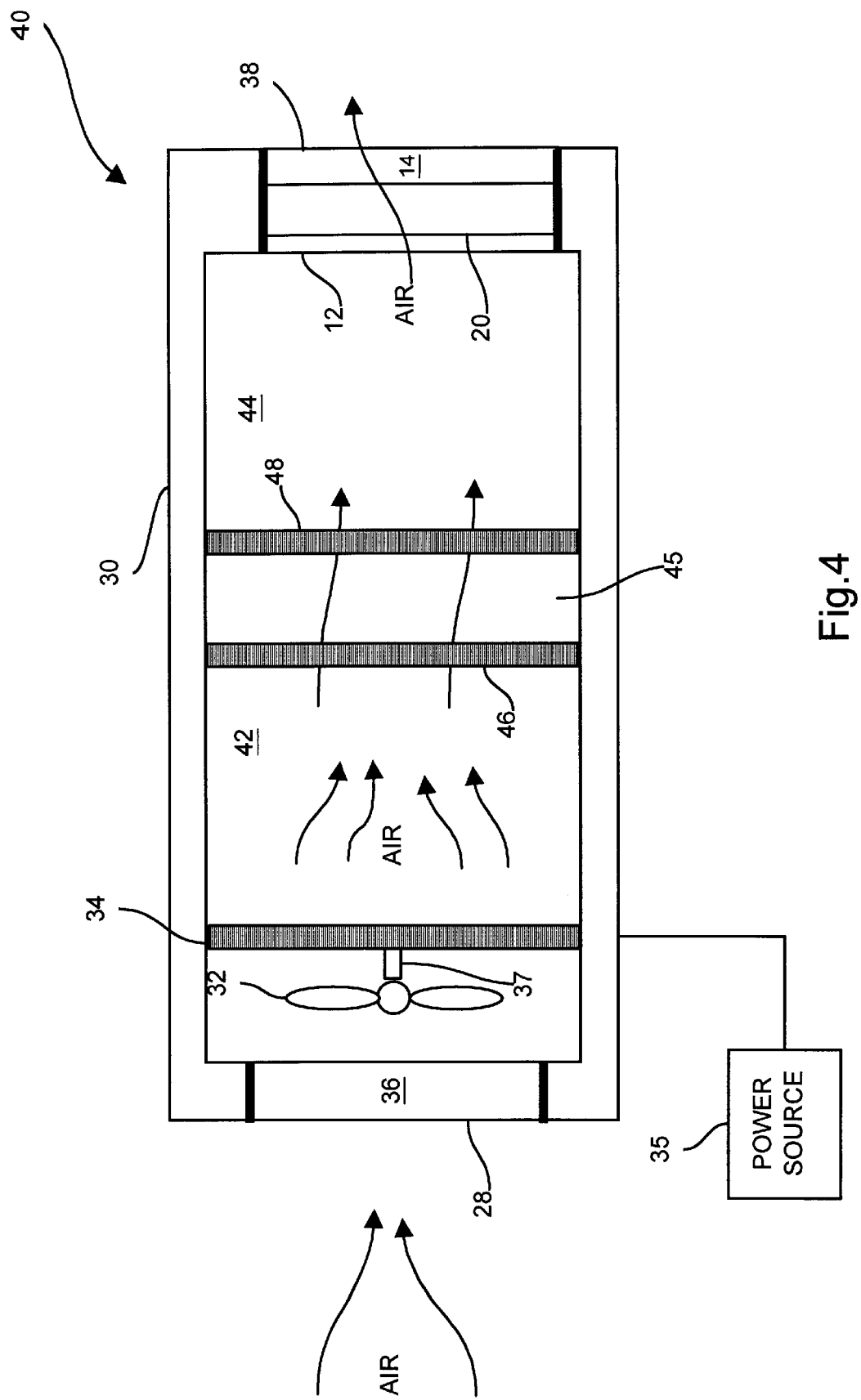
FIG. 4 is a sectional view of an air filtering apparatus in accordance with an embodiment of the present invention.

FIG. 4 illustrates yet another embodiment of the present invention where an additional filtering medium 45 is provided in air purification system 40. In the presence of this additional filter medium 45 the air purification system 40 is capable of further elimination of residual gases and odour from the air. Air purification system 40, as depicted in FIG. 4, is similar in construct to the system 40 of FIG. 3. Filter medium 45 is positioned within housing 30 and defines first and second passages 42 and 44. In this location, filter medium 45 serves to remove odour and residual gases before the passing air reaches filter unit 10. Filter medium 45 extends across the inner dimensions of housing 30 and includes a predetermined volume of refined zeolite evenly distributed throughout. Alternatively, filter medium 45 may comprise of first and second permeable walls 46 and 48 with an appropriate volume of refined zeolite displaced there between. Where a filter medium 45 is provided in housing 30, air is drawn through air inlet 28 by air intake means 32 and into the first passage 42, and subsequently passes through filter medium 45 into the second passage 44, reaching filter unit 10 as it proceeds to be forced through air outlet 38.

The above description of the embodiments of the present invention, taken in conjunction with the following scientific support, disclose the capability of the present invention. As previously mentioned, the air filter of the present invention, namely the iodinated resin substrate, is not limited by the embodiments described above. It is herewith fully contemplated that the iodinated resin filter of the present invention has a multitude of applications in the art of air purification and filtration.

EXAMPLE 1

MS2 Bacteriophage

MS2 Bacteriophage were employed as the test organism in the investigation of the iodinated resin substrate of the present invention as an effective filtering medium for bacteria, fungi and viruses. MS2 bacteriophage belong to a group of viruses which contain RNA as the genetic material and whose hosts are bacteria. This virus is approximately 26 to 27 nm in diameter and is icosahedral in shape. This virus is particularly useful for laboratory experimentation as it only infects male strains of *Escherichia coli*. Several other useful characteristics of MS2 bacteriophage include their high rate of replication (causing lysis of the bacterium in 30–40 minutes) and a high yield of infectious progeny particles (approximately 10,000 per cell). MS2 bacteriophage have been used in disinfection efficacy experiments as a surrogate for polio viruses, enteroviruses and other more serious human pathogenic RNA viruses, because of its size, shape and nucleic acid composition. Accordingly, MS2 bacteriophage was considered a representative test organism for the purpose of testing the filtering capabilities of the iodinated resin substrate of the present invention.

Experimental Design

The testing of the impregnated resin substrate of the present invention was constructed such that accurate measurements of particulate reduction could be obtained on a volume of air basis. Initially, a 1.0 m³ unit including a fan, was attached to the iodinated resin substrate of the present invention and the air flow exiting the filter unit was measured at both high and low speeds (High=1.0 m³/min, Low=0.2 m³/min). Test samples of MS2 bacteriophage were aliquoted at a concentration of $10^{10}$ PFU/ml. Sterile water samples were used as negative controls. Subsequently, MS2 bacteriophage aliquots were introduced into the filter unit in atomized form (to provide the positive samples), and the filter unit was then sealed with the iodinated resin substrate. The outflowing air was sampled for 10 minutes at 12.5 L per minute (representing 0.125 m³ of air). A glass impinger containing TYGB broth was used in sampling the air.

Samples

MS2 bacteriophage were introduced in a freshly disinfected unit which was subsequently sealed with filters as outlined above. The filter unit ran for 5 minutes at a low setting (representing a sample of 1.0 m³ of air). The filter unit was then turned off and the glass impingers subsequently ran for an additional 10 minutes at 12.5 L per minute to sample for residual bacteriophage. Samples of TGYB broth were removed from the glass impingers and plated with host *E. coli* and the number of plaques enumerated. On the basis of plaque formation, the reduction in MS2 bacteriophage was calculated (Table 1).

Results

The results of the experimentation described above indicated that the iodinated resin substrate was capable of significantly reducing airborne bacteriophage levels. As illustrated in Table 1, the iodinated resin substrate of the present invention obtained up to 88.10% reduction in airborne bacteriophage content. Negative control samples indicated that there was no MS2 bacteriophage present in the unit prior to the introduction of aliquoted MS2 samples.

TABLE 1

Results of MS2 Bacteriophage Reduction Experiment.

| Date | Sample | Start Temp. | Start RH | End Temp. | End RH | Phage PFU/m³ | % Reduction |
|---|---|---|---|---|---|---|---|
| 10-04-99 | Neg. Control | 22° C. | 55% | 22° C. | 60% | <1000 | |
| | Neg. Control | 21° C. | 43% | 21° C. | 68% | <1000 | |
| 12-04-99 | Pos. Control | 21° C. | 31% | 21° C. | 51% | 5.6 × 10⁹ | 70.00% |
| | Filter Run | 21° C. | 51% | 21° C. | 70% | 1.68 × 10⁹ | |
| 15-04-99 | Pos. Control | 24° C. | 32% | 24° C. | 47% | 3.696 × 10⁹ | 88.10% |
| | Filter Run | 24° C. | 35% | 24° C. | 44% | 4.400 × 10⁸ | |
| 16-04-99 | Pos. Control | 22° C. | 36% | 22° C. | 66% | 6.16 × 10⁹ | 84.00% |
| | Filter Run | 22° C. | 54% | 22° C. | 76% | 9.84 × 10⁸ | |
| 19-04-99 | Pos. Control | 22° C. | 50% | 22° C. | 72% | 1.44 × 10⁹ | 57.78% |
| | Filter Run | 22° C. | 44% | 22° C. | 67% | 6.08 × 10⁸ | |
| | Pass Through | | | | | 1.36 × 10⁸ | |
| | AVERAGE | 22.1° C. | 43% | 22.1° C. | 62% | | 75% |

Upon completion of the reduction experiment discussed above, the iodinated resin substrate was removed from the filter unit and any residual bacteriophage were eluted off the resin into TYGB broth. The eluted sample was then introduced to host-containing plates and viable MS2 bacteriophage were enumerated by plaque counts (Table 2).

TABLE 2

MS2 Bacteriophage viability counts from eluted resin.

| | Viable MS2 PFU/ml | Viable MS2 PFU/filter | MS2 Exposed PFU/filter | Log Attenuated | % Attenuation |
|---|---|---|---|---|---|
| Sample 1 | 29 | 2900 | 1.318 × 10¹⁰ | 6.658 | 99.9999 |
| Sample 2 | 29 | 2900 | 1.318 × 10¹⁰ | 6.658 | 99.9999 |

The results of the viability plating indicated that a 6.658 log reduction in MS2 bacteriophage viability was achieved by the iodinated resin substrate. This translated into a 99.9999% attenuation of MS2 bacteriophage over the duration of the experiment.

Conclusions

The success of the iodinated resin substrate of the present invention to immobilize and attenuate MS2 bacteriophage from the air is an indication of the potential of such a substrate to be incorporated in a variety of air filtration systems for the safe and effective removal of bacteria, fungi and viruses from the air. The use of MS2 bacteriophage in the experimentation described above was deliberately chosen as a representative organism for all potentially hazardous airborne microbes. On the basis of the well known resistance of such viruses against a variety of disinfectants, the discovery of the effectiveness of the iodinated resin substrate (as described and illustrated as filter plate 20—FIGS. 1–3) against MS2 bacteriophage is herewith held with confidence to be a further indication that the iodinated resin substrate of the present invention is similarly effective against other viruses, bacteria and fungi.

It is believed that the percentage reduction in airborne microbes can be increased with the employment of the present invention, with improvements to the fan incorporated within the unit described above. In addition, further investigation is required to determine the optimal life time of the iodinated resin substrate.

What is claimed is:

1. A method of purifying air, said method comprising of passing contaminated air through a filter unit; wherein said filter unit includes a particulate immobilizing medium; an iodinated resin substrate; and a zeolite composite medium.

2. A multi-layered air filter for use in purifying air of a variety of contaminants, said air filter comprised of:

a particulate immobilizing medium;

an iodinated resin substrate; and a zeolite composite medium.

3. The multi-layered air filter of claim 2 wherein said iodinated resin substrate comprises of a carrier substrate impregnated with iodine resins which serve to filter bacteria, fungi and viruses from the air passing therethrough.

4. An air purification unit for insertion in an air flow system, comprising:

a housing having an air inlet and an air outlet; and a multi-layered air filter proximate said air outlet;

wherein said multi-layered air filter includes a particulate immobilizing medium, an iodinated resin substrate and a zeolite composite medium.

5. The air purification unit of claim 4 further comprising a filtering medium proximate said air inlet.

6. The air purification unit of claim 4 or 5 further including a mid-stream zeolite composite filter arrangement.

7. An air purification system comprising:

a housing having an air inlet and an air outlet;

an air intake means in connection with said housing for drawing air into said air inlet and subsequently forcing air to exit said housing at said air outlet; and a multi-layered air filter proximate said air outlet;

wherein said multi-layered air filter includes a particulate immobilizing medium, an iodinated resin substrate and a zeolite composite medium.

8. The air purification medium of claim 7 further comprising:

a mid-stream zeolite composite filter arrangement.

9. The air purification system of claim 7 or 8 further comprising a filtering medium proximate said air inlet.

* * * * *